Figure 1:
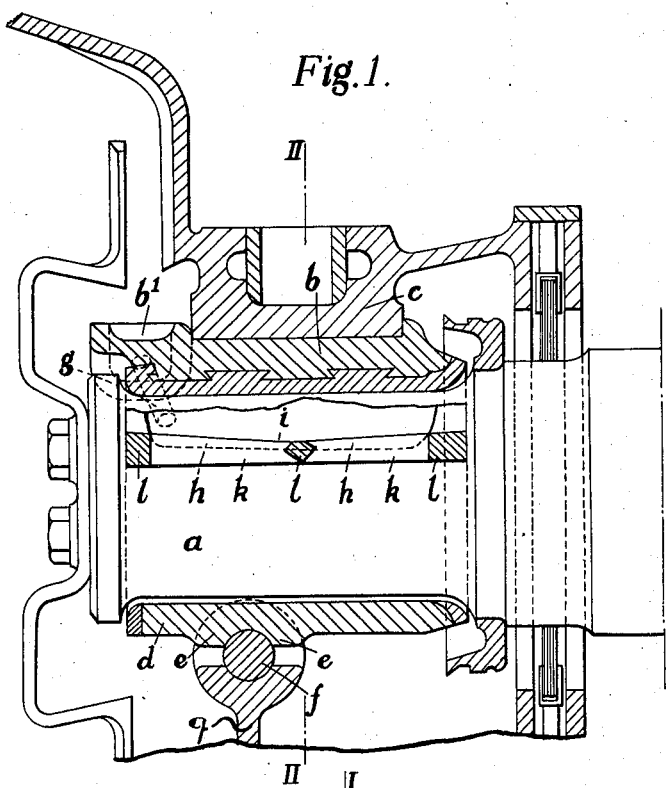

March 1, 1932. W. PEYINGHAUS 1,848,026

AXLE BEARING

Filed Dec. 5, 1930

INVENTOR
Walter Peyinghaus
BY
ATTORNEYS

Patented Mar. 1, 1932

1,848,026

UNITED STATES PATENT OFFICE

WALTER PEYINGHAUS, OF EGGE, NEAR VOLMARSTEIN, GERMANY

AXLE BEARING

Application filed December 5, 1930, Serial No. 500,355, and in Germany September 3, 1929.

Axle bearings for railway vehicles with a fixed journal collar, solid bearing bushes divided in the middle, and an oil space in the bottom bush member are known, in which the axle journal during its rotation sucks up the oil for itself from the aforesaid space, whilst the oil flows of itself to the oil space from an oil bath with a high oil level. This construction, owing to the high oil level, runs the risk of losing oil on emergency runs and is unreliable in its suction action on account of the admission of air at the gap between the bush members and on the widening of the oil space in consequence of wearing of the bush and change of journal diameter. Furthermore, this construction is not adapted to absorb lateral shocks which are produced by braking and acceleration forces.

Another known axle bearing construction with a solid undivided bush and bottom oil space delivers the oil by means of a scooping plate connected with a fitted collar first upwards so as to allow it to enter from the front of the bearing into the actual neck of the bearing. This construction necessitates the alteration of the whole axle bearing on account of the fitted collar, renders the maintenance of the neck of the bearing dependent upon the position and the condition of the front of the bearing and cannot absorb the lateral shocks without disturbing the suction action of the oil space and without giving rise to the danger of crumbling away of the bearing metal by the lateral shocks.

Both of the constructions mentioned have in common the disadvantage that the ratio of bush diameter to journal diameter must not exceed a certain limit if the suction action of the journal rotating in the bush is still to be present. This necessitates, however, narrowly fixed limits of wear and a stock of bushes with graduated diameters for journals with diameters varying by as much as 10 mms. Both constructions furthermore require half a revolution from the position of rest to enable oil again to flow into the bearing zone, and have to absorb the lateral pressures by means of the sensitive soft metal of the bearing surfaces.

According to the present invention, all these disadvantages are avoided by dividing the solid axle bush along lines above the axial horizontal plane of the axle journal and by inclining the surfaces of the adjacent longitudinal edges of the bush members towards the middle of the axle and by providing slot-like apertures between the surfaces and supplying the oil, which is delivered upwards in the known manner by a centrifugal member to the top bush member, by way of outwardly turned gutter-like oil grooves into the aforesaid apertures whereby it runs over the inclined surface of each longitudinal edge of the upper bush member and finally passes from a dripping edge on to the journal at about the middle of the axle. The bottom bush member extends above the middle of the axle and is provided with projections or spacing members along its longitudinal edges to abut in places against the edges of the top bush member and thereby form the aforesaid slot-like apertures.

The bottom bush member also bears against the axle journal at both sides for the purpose of absorbing lateral shocks and is furnished with bearing fillets or insertions to take the pressure.

The said bottom bush is kept in position by suitable means such as one or more transverse bolts.

The invention is illustrated by way of example in the accompanying drawings, in which:—

Figure 2:
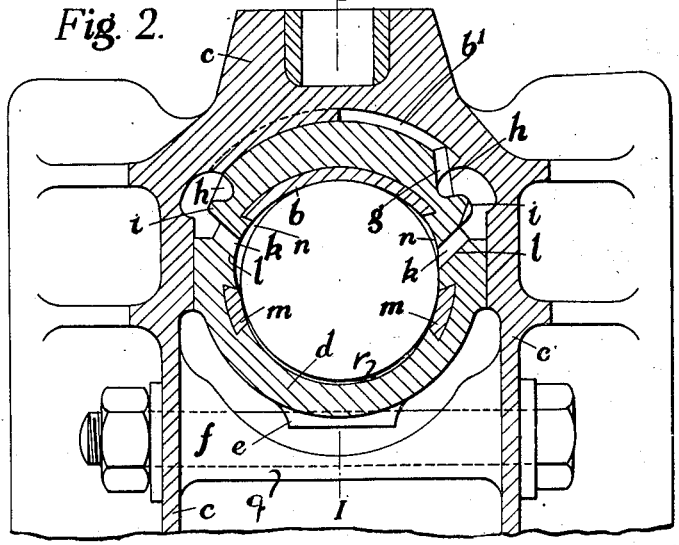

Fig. 1 is a longitudinal section through an axle bearing on the line I—I of Fig. 2; and Fig. 2 is a cross section through the axle bearing on the line II—II of Fig. 1.

In the drawings, $a$ is the axle journal. $b$ the top member of the bearing bush, $c$ the axle bearing casing, $d$ the bottom member of the bearing bush, and $e$ is a transversely disposed fork on the underside of the bush member $d$ for engagement with a transverse bolt $f$ which supports the said bush portion. Transverse passages $g$ conduct oil caught by a projecting part $b'$ of the top bush member $b$ into gutter-like longitudinal grooves $h$ having overflow edges $i$. $k$ are slot-like apertures between the oblique or inwardly inclined surfaces of the adjacent longitudinal edges of the top and bottom bush members. These apertures are formed by the provision of trapezoidal shaped projections or spacing members $l$ on the longitudinal edges of the lower bush member. The oblique or inclined surfaces of the upper bush member terminate in drip edges $n$ whereby the overflow from the grooves $h$ is made to drip onto the journal. Because of the arrangement and shape of the members $l$ the dripping line is substantially continuous. $m$ are insertions or fillets in the side portions of the bottom bush member for absorbing lateral shocks, the bush member itself not actually bearing against the axle except at the sides.

The lower bush also forms at its lower point a sickle-shaped collecting chamber $r$ for the lubrication of the fillets $m$.

The lower bush is held in its correct position relative to the upper bush by transverse bolt $f$. This bolt also takes up shocks in the vertical and axial directions which act upon the lower bush and transmits them to the casing by means of the rib $q$, which embraces the bolt along its entire length in the form of a saddle-like projection or forked formation so as to relieve it from bending forces. Due to the dished contour (see Fig. 1) of the outer part of the head of rib $q$, oil which may be sprayed thereagainst is deflected and prevented from creeping between the bolt $f$ and its bore. Any oil or oil spray which may reach the troughlike portion of rib $q$ (see Fig. 2) will be led, owing to the sloping sides of that portion, to the lowest part, (where in Fig. 2 it is intersected by section line I—I) whence the oil will return to the oil bath. By these means oil is prevented from passing in the direction of the bolt to the outer packing discs thereof.

The operation of the bearing above described is as follows:—

The oil that is caught in the projecting part $b'$ of the top bearing bush member runs through the transverse passages $g$ into the gutter-like longitudinal grooves $h$ which slope towards the median transverse plane from both ends of the bearing so that when the oil delivery is small, preferential oiling occurs at the middle of the bearing surface, and when the vehicle is in an oblique position, oiling takes place with certainty over at least one half of the width of the bearing. The oil that has run through the gutter flows over the overflow edges $i$, into the slot-like openings $k$, and down over the oblique or inclined edge surfaces of the upper bush member and forward to the dripping edges $n$ from which it drips onto the axle journal. The gutter-like grooves or channels may be tapered in width towards the median plane of the bearing. Their cross-section can thus be formed to taper towards the mid point of their length. In the case of small journal diameters, the dripping edge $n$ can be shifted towards the middle by giving the aforesaid inclined surfaces a smaller inclination towards the middle. Moreover, the bottom bush member, which is provided with exchangeable lateral abutting fillets $m$, provides in all cases for oiling the journal even in the case of the smallest journal diameters, owing to the fact that an oil pit is formed above these fillets $m$. The oil which collects beneath the axle journal in the oil space of the bottom bush member is, generally, only taken along by the axle journal as far as the lateral fillets $m$ of the bottom bush member and should, principally, ensure the provision of the ascending parts of the bearing surface with oil.

The advantages of this construction lie in the fact that it is only necessary that the journal should rotate about 90 degrees before oil reaches the upper bearing zone, that the journal collar can, as hitherto, remain fixed, that lateral pressures are absorbed by the bottom bush member and not by the sensitive soft metal of the top bush member, that the top bush member has an uninterrupted large bearing surface and is thus subjected to the smallest possible wear, and the principle of a standard bush for journals with changing diameter can be maintained because only the lateral abutting fillets $m$ of the bottom bush member need be exchanged to suit the particular diameter of the journal, whilst the top and bottom lubrication of the bush remains operative in every case.

What I claim is:—

1. A railway vehicle axle bearing comprising a bush casing and a bearing bush therein divided longitudinally along lines above the horizontal axial plane, the adjacent surfaces of the bush members being spaced apart and inclined towards the middle of the axle, means for supplying lubricant to the upper bush member, and channels in the latter for conducting the lubricant by eventual overflow into the longitudinal spaces between the bush members.

2. A railway axle bearing comprising a bush casing and a bearing bush therein divided longitudinally along lines above the horizontal axial plane, the adjacent surfaces of the bush members being spaced apart and inclined towards the middle of the axle, longitudinal gutter-like channels located on the external surface of the upper bush member above the spaces between the aforesaid spaced adjacent surfaces, and means for supplying lubricant to the channels whence by overflow it passes into said spaces.

3. A railway axle bearing according to claim 2, the longitudinal gutter-like channels being tapered in width towards the median transverse plane of the bearing.

4. A railway axle bearing according to claim 1, the lower bush member bearing against the axle only at its sides.

5. A railway axle bearing according to claim 1, including means extending transversely across the bush casing beneath the lower bush member, and a forked formation on the underside of said bush member engaging and receiving support from said transversely extending means.

6. For use with a railway axle bearing of the kind in which oil is constantly picked up from within a bearing casing and delivered to the upper part of the bearing bush, a bearing bush divided longitudinally along lines above the horizontal axial plane into two members the adjacent longitudinal surfaces of which are inclined inwardly and downwardly, means for keeping said surfaces spaced a predetermined distance apart, and gutter-like longitudinal channels located above the spaces between the aforesaid spaced surfaces, whereby oil supplied to said channels overflows into said spaces and thence onto the axle.

7. A bearing bush as claimed in claim 6, the means for spacing apart the adjacent longitudinal surfaces of the bush members being integral projections on the lower bush member.

8. A bearing bush as claimed in claim 6, the gutter-like longitudinal channels on the upper bush member being of a form tapering cross-sectionally towards the mid point in their length.

9. A bearing bush as claimed in claim 6, including bearing fillets inserted in the side portions of the lower bush member.

10. A bearing bush as claimed in claim 6, including a fork or saddle-like projection extending transversely on the underside of the lower bush member to serve as a supporting bearing therefor.

11. A bearing bush as claimed in claim 6, the surfaces of the upper bush member which face the corresponding surfaces of the lower bush member terminating each in an oil dripping edge slightly above the horizontal axial plane of the bush.

12. A bearing bush as claimed in claim 6, the gutter-like longitudinal channels being sloped downwardly from each end towards the mid point in their length.

In testimony whereof I have signed my name to this specification.

WALTER PEYINGHAUS.